Aug. 4, 1964　　　A. R. BRAULT ETAL　　　3,143,589
REMOTE FILM VIEWER

Filed March 22, 1961　　　　　　　　　　　5 Sheets-Sheet 1

INVENTORS
ANDRE R. BRAULT
ANWAR K. CHITAYAT
BY James P. Malone

Aug. 4, 1964 A. R. BRAULT ETAL 3,143,589
REMOTE FILM VIEWER
Filed March 22, 1961 5 Sheets-Sheet 3
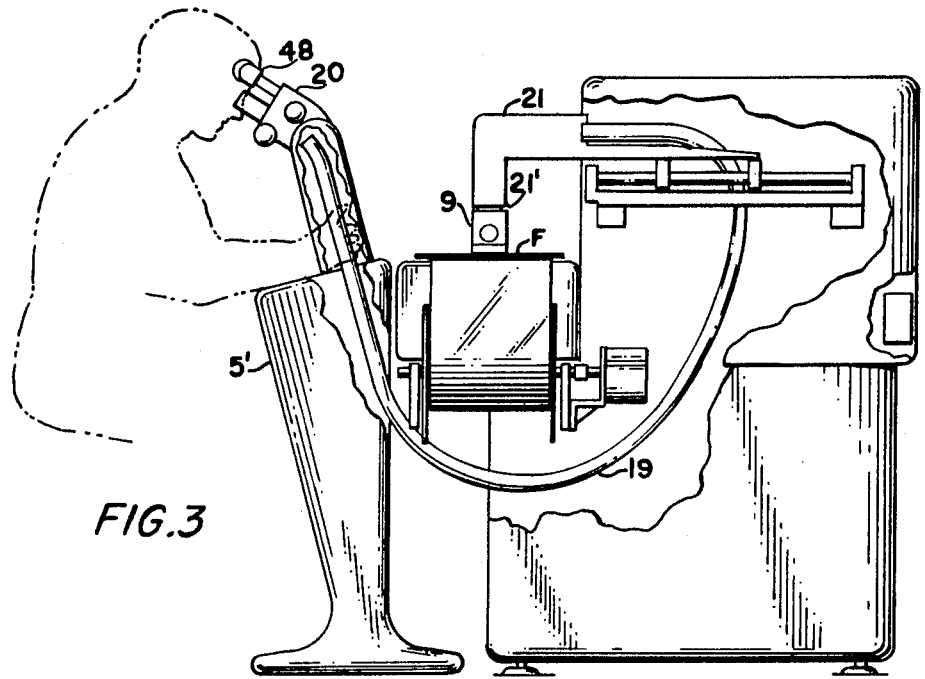
FIG.3
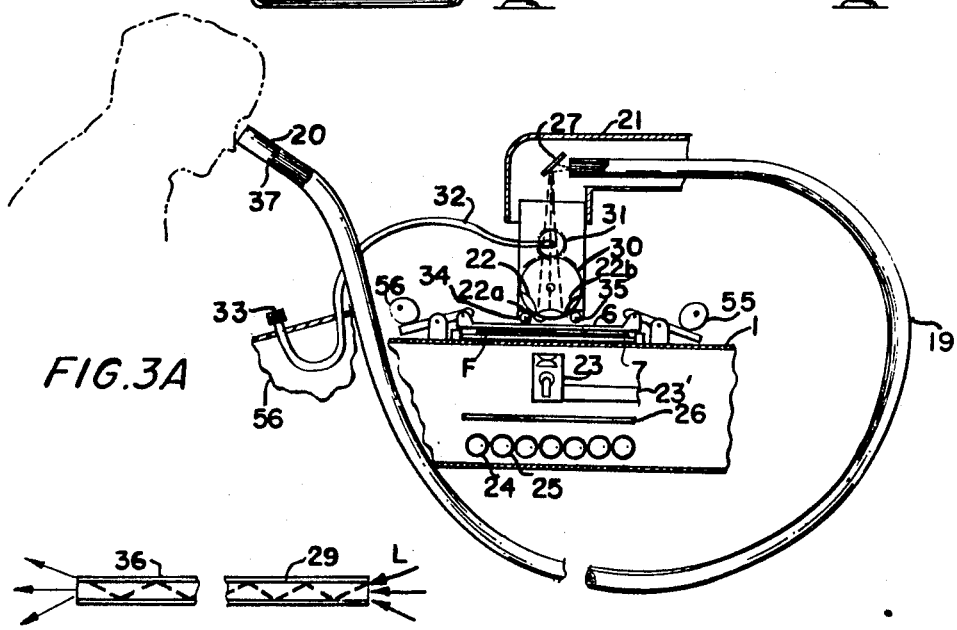
FIG.3A
FIG.3B
INVENTORS,
ANDRE R. BRAULT
ANWAR K. CHITAYAT
BY James P. Malone Aug. 4, 1964　　　A. R. BRAULT ETAL　　　3,143,589
REMOTE FILM VIEWER Filed March 22, 1961　　　　　　　　　5 Sheets-Sheet 4

INVENTOR.
ANDRE R. BRAULT
ANWAR K. CHITAYAT
BY
James P. Malone

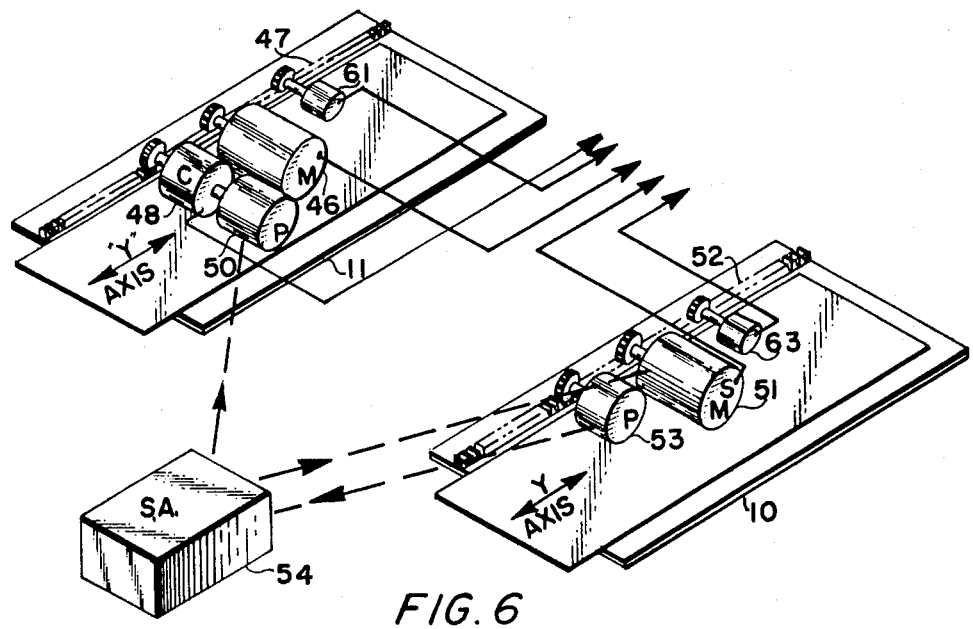
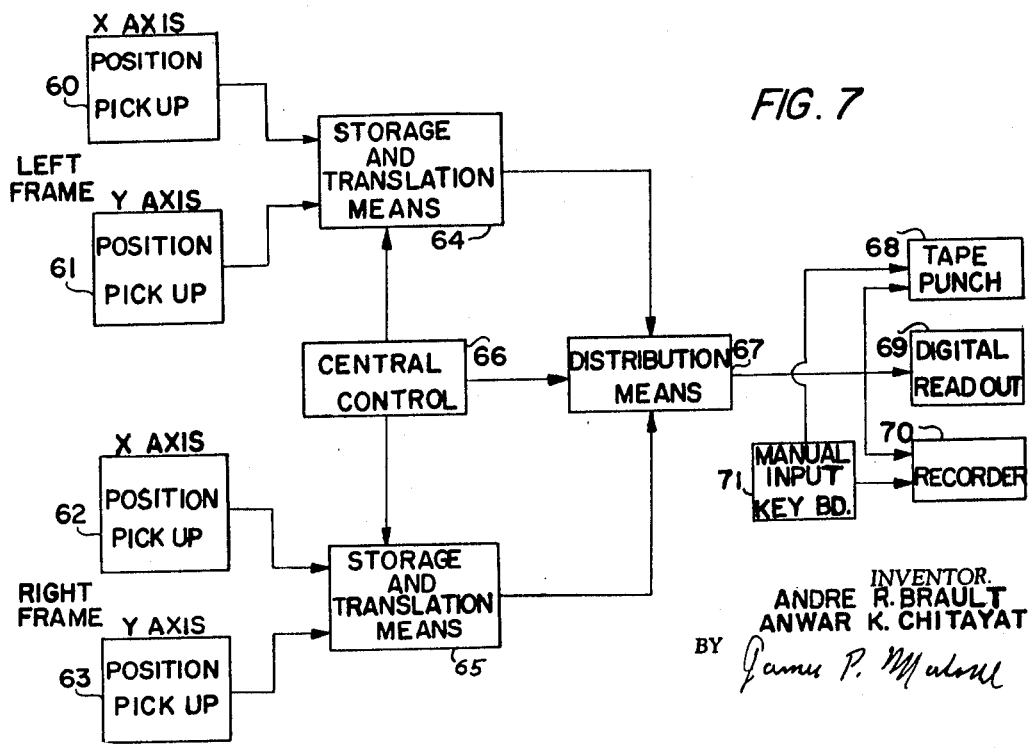

United States Patent Office 3,143,589
Patented Aug. 4, 1964

3,143,589
REMOTE FILM VIEWER
Andre R. Brault, North Merrick, and Anwar K. Chitayat, Plainview, N.Y., assignors to Optomechanisms, Inc., Mineola, N.Y.
Filed Mar. 22, 1961, Ser. No. 97,480
3 Claims. (Cl. 88—31)

This invention relates to remote film viewing means including stereo viewing means.

More particularly the invention relates to means for viewing large films, for instance in the measurement and interpretation of aerial photographs and surveys.

The present invention permits the operator to conveniently view, automatically measure and record, through a tape punch, the coordinates of coincidence stereo points on right and left frames, or successive motion picture frames, and also, if desired, view and record data from a single photographic frame. For instance, one thousand (1000) foot capacity 70 mm., 5" or 9½" film with frame size up to 9" x 40" can be processed for data reduction.

This invention generally comprises a film handling table, a control table or panel and digital readout equipment.

The film table contains the film, illumination sources, transport mechanisms, the X–Y axis carriages, and mechanical drives required for the coordinate readout. Two objective systems and fiber optics "cables" transmit the information from the two frames of film to control table viewing optics.

The control panel contains the eyepieces for viewing as well as all the controls necessary for the operator to view and record the desired portions of the film. This table is separate from the film table and can be readily moved and positioned for maximum operator convenience. This feature is made possible by using fiber optics to transmit the image from the film to the control table. The present invention is suitable for feeding digital readout means and means for the display, control, recording or other utilization of data obtained by the viewer.

Some of the important features and objects are listed below and are explained in greater detail hereafter.

Fast, accurate point to point automatic positioning and measuring for recording on punch tape, or other utilization means.

Extreme flexibility through application of fiber optics.

Automatic selection of any one of several magnification powers to approximately 30 ×.

Convenient controls for illumination, advancing, positioning, viewing and recording, all located on control panel of operator's viewing console.

Accordingly, a principal object of the invention is to provide new and improved film viewing means.

Another object is to provide new and improved stereo film viewing means.

Another object of the invention is to provide new and improved stereo film viewing means utilizing fiber optics.

Another object is to provide new and improved stereo film viewing means utilizing fiber optics for viewing large film.

Another object of the invention is to provide new and improved means for reading, interpreting and measuring large films, for instance, aerial photographs.

Another object of the invention is to provide new and improved means for handling, reading, interpreting and measuring large films, for instance, aerial photographs having means for recording measurements.

Another object of the invention is to provide new and improved remote viewing means in film with automatic position reading and recording, and means located on a stationary control panel, for controlling the illumination of optical pickups and position.

Another object of the invention is to provide new and improved means for making measurements on film with very high accuracy.

Another object of the invention is provide new and improved means for making measurements on film with very high accuracy having visual display of said measurements of coordinates and means for controlling and recording or otherwise utilizing such measurements.

These and other objects of the invention will be apparent from the following specification and drawings of which;

FIGURE 3 is a side view of the embodiment of FIGURES 1 and 2.

FIGURES 3A and 3B are detail views of FIGURE 3.

FIGURE 6 is a perspective view of the Y axis drive for the carriages.

FIGURE 7 is a block diagram of measurement indicating, recording and utilization means.

Figure 1:
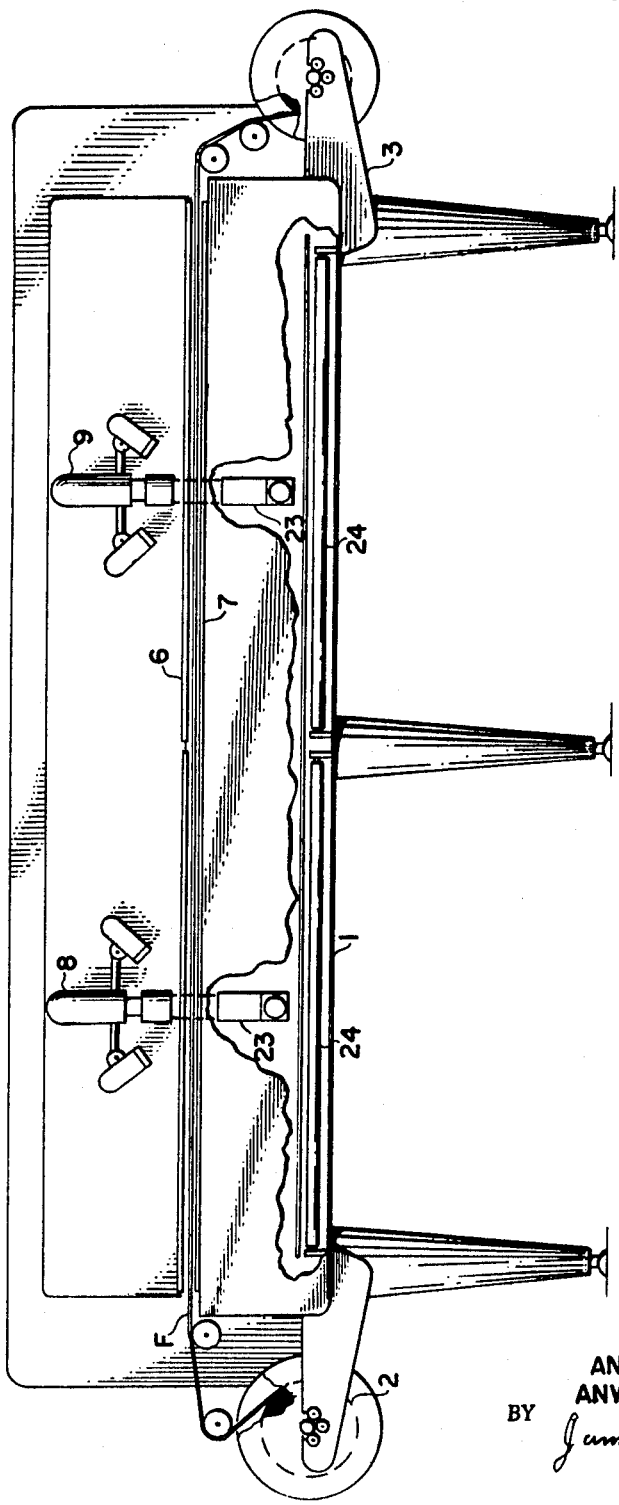
FIGURE 1 is a front view of part of an embodiment of the invention.
Figure 2:
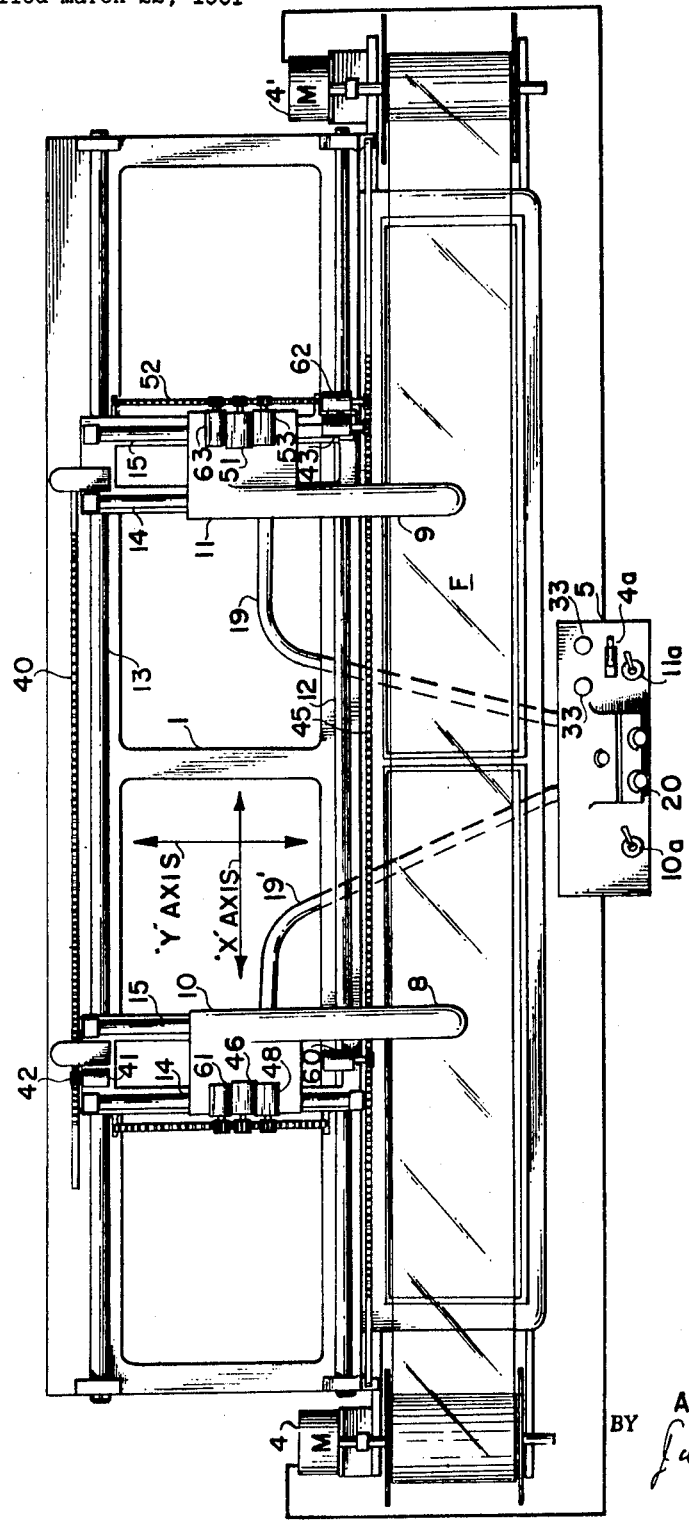
FIGURE 2 is a top view of the embodiment of FIGURE 1.
Figure 4:
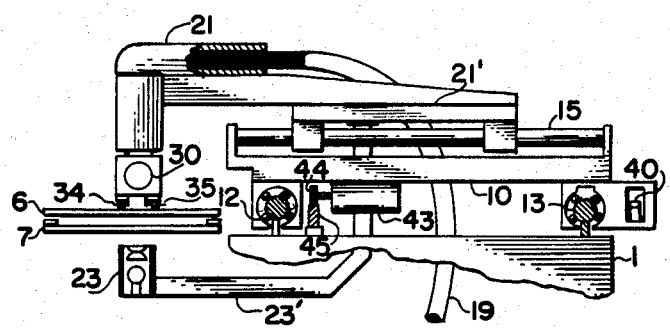
FIGURE 4 is a detail view of the carriage mounting.

Referring to FIGURES 1, 2, 3 and 3A, the invention generally comprises a film handling table 1, having an input reel mounting 2, and output reel mounting 3. Drive means for the film are provided by the motors 4 and 4', which are connected to be controlled from switch 4A on the control panel 5.

Glass pressure plates 6 and 7 are mounted on the table 1, on the top and bottom of the film F, the pressure plates are preferably movably mounted so that they can be raised and lowered from the control panel 5, or automatically opened when the film drive motor 4 is energized.

The film is viewed by visual pick up means 8 and 9 which are mounted for movements along the "X" axis and perpendicular "Y" axis. More specifically, the visual pick up means are mounted on right and left carriages 10, 11 which are mounted on rails 12, 13 for movement along the "X" axis. Each carriage has a pair of rails, 14, 15 for movement of the visual pick up means 8 and 9 along the "Y" axis. These movements are all controlled from the control panel 5, as will be discussed. Each carriage has optical or shaft rotation measuring means to make measurements of coordinates along each axis. The optical measurement means may be optical diffraction gratings with pulse counters which may be conventional and which provide very high accuracy readings. Alternatively, the carriage position measuring means may be conventional means for converting shaft position to digital form, as discussed in connection with FIGURE 7. The mechanical mountings for the carriages are also very accurate and have a minimum of backlash. The mountings for the carriages are preferably of the type shown in co-pending patent application entitled Work Layout Means S.N. 29,052, filed May 13, 1960, now Patent No. 2,995,826, granted August 15, 1961.

FIGURE 3A shows details of the visual pickup means 8 and 9. The visual pickups are mounted on an arm 21 which is mounted on the movable carriage. The arm 21 extends out over the film F on the film table and the objective lens 22 is mounted on the end of the arm 21 in a vertical extension 21' thereof. A high intensity light source 23 is mounted on an arm 23' which is mounted on the carriage and which extends under the film and directly under the objective lens 22. Background light is provided by light bulbs 24, 25, etc., which are mounted under a ground glass 26 below the light source 23. The image from the film is projected upwardly to the mirror 27, and then through the fiber optics cable 19 to the stationary eyepiece 20. The intensity of all lighting is preferably controlled from the control panel by conventional means.

FIGURES 3 and 3A illustrate the optics required for the proposed viewer. It contains Objective Lenses, Fiber Cables and Viewing Eyepieces, preferably of constant magnification 3×.

The objective lenses 22, 22a, 22B are located close to the film surface and may be standard microscope objectives. A well defined image is produced at the plane of the "fiber optics" 19 bundle, after reflection on a front surface mirror 27. Each frame is viewed through one lens contained in a rotary turret 30. Each rotary turret contains three or four separate objectives, preferably providing for the following objective magnifications: approximately 10×, 4×, 2× and 1×. The lenses are preferably located within barrels, each having a different distance from the viewed film, in order to provide the proper conjugate distances.

The magnification indexing knobs 33 are located on the control panel 5 close to the viewing eyepieces allowing the operator to change magnification by remote control while viewing film. A detent is preferably provided in each magnification setting for positive positioning. The control knobs 33 may be connected to the turret 30 through gear 31 geared to the turret and flexible cable 32, or alternatively may be motor controlled.

Precision ball bearing type casters are preferably added to the turret to insure that the objectives remain in focus when any portion of the film is viewed. The objective optics, including the plane of the fiber optics, are preferably made to slide up and down. Two ball bearings 34, 35 are linked to the objective turret, so that the balls touch the upper surface of the top glass pressure plate. Consequently, the distance between the objective lenses and the glass plate is kept constant independent of any slight misalignment or poor flatness of the table or the glass plate.

The fiber optics cables 19, 19' transmit the image from the film table to the control table. The size of the fibers is chosen so that the resolution of the optics is better than the visual acuity of the eye, and no loss of performance is obtained.

It is possible to twist both cables 19, 19', by as high as ±180° for crab adjustment in order to rotate the image slightly. This rotation is easily achievable, since the length of the cable is over 6'.

The fiber optics consist of cables 19, 19' about 1" diameter, each containing a coherent bundle of fibers. The state of the art in the field of glass fibers is such that these cables are commercially available.

Each fiber consists of a glass rod of a diameter preferably about .0005", having a length of approximately six feet. As shown in FIGURE 3B, light enters each fiber 29 and is then reflected within the rod; if the light rays L enter at an angle not exceeding 30° from the axis of the fiber, then they are totally reflected in a similar manner to total reflection in a prism.

FIGURE 3B illustrates the provision of a jacket 36 around each fiber, consisting of glass of low refractive index. Its purpose is to prevent leakage of light from one fiber to another by allowing for total reflection to occur within each fiber. In addition, it protects the walls of the fibers keeping them clean and smooth, preventing any possible diffusion of light through the sides.

Each cable will be preferably enclosed in a flexible rubber or plastic sheath, similar in construction to a hydraulic aircraft cable, in order to prevent twisting, and to protect the fibers from breakage in handling. The cables 19, 19' are commercially available.

The optical design chosen for the proposed viewer is such that the final resolution as viewed by the observer is better than can be detected by the human eye.

Suitable magnification is achieved by the microscope objective 22 which magnifies the object by an adjustable magnification of 1× to 10×. The image transmitted by the fibers is preferably magnified by a 3× eyepiece, having a constant magnification. Since the fibers are preferably .0005" apart, it would not be possible for the observer to detect the presence of the fibers in the field of view, thus preventing the deterioration of optical image quality.

The overall resolution achieved here is better than 20 line pairs per millimeter for 3× overall magnification, and 200 line pairs per millimeter for 30× magnification. Furthermore, the bending of the cable presents no effect whatsoever on the image being observed as long as the fibers are not broken by extremely sharp bending. This possibility of sharp bends is prevented by using the surrounding cable cover.

The conventional viewing eyepieces 20 are fixed to the rigid structure of the control table 5. The operator sits with his head on the headrest, viewing the right hand frame with his right eye and the left hand frame with his left eye. Because of the use of flexible fiber optic cables, the eyepieces do not move with the objectives, hence the operator can adjust his position for maximum comfort. Each eyepiece preferably has its own fine focus control to accommodate the operator. The reticle 37 is located within .005" maximum from the plane of the fiber optics, and therefore no parallax is possible.

When viewing stereoscopically the operator sees the superimposed images transmitted by both left and right fiber cables. However, when only a single photographic frame is viewed, the operator rather than viewing through only one eye, as in a single objective type microscope, can preferably change to a binocular type viewing eyepiece for instance by simply pushing a lever located in the eyepiece housing. This action slides and locates a beam splitting prism, not shown, coupled to a front surface mirror which deflects part of the light path so that each eye will see the image as in binocular viewing. The front surface mirror, naturally blacks out the one objective system not in use. Black out shutters are also preferably provided in each optical system to permit the operator to view with one eye, either left or right images.

FIGURES 2, 4, 5 and 6 shows the carriages. Each carriage 10, 11 slides separately along the X axis on two precision ground shafts 12, 13, through ball bearing supports. A 60° opening on the bottom of the bushing allows the precision ground rods to be supported by the table 1. Each carriage contains a pair of similar rails 14, 15, which are mounted along the Y axis on the carriages, upon which is mounted the arm 21, FIGURE 4, containing the optical pickup.

Suitable ways and mountings as described above have been described in the aforementioned patent application.

Figure 5:
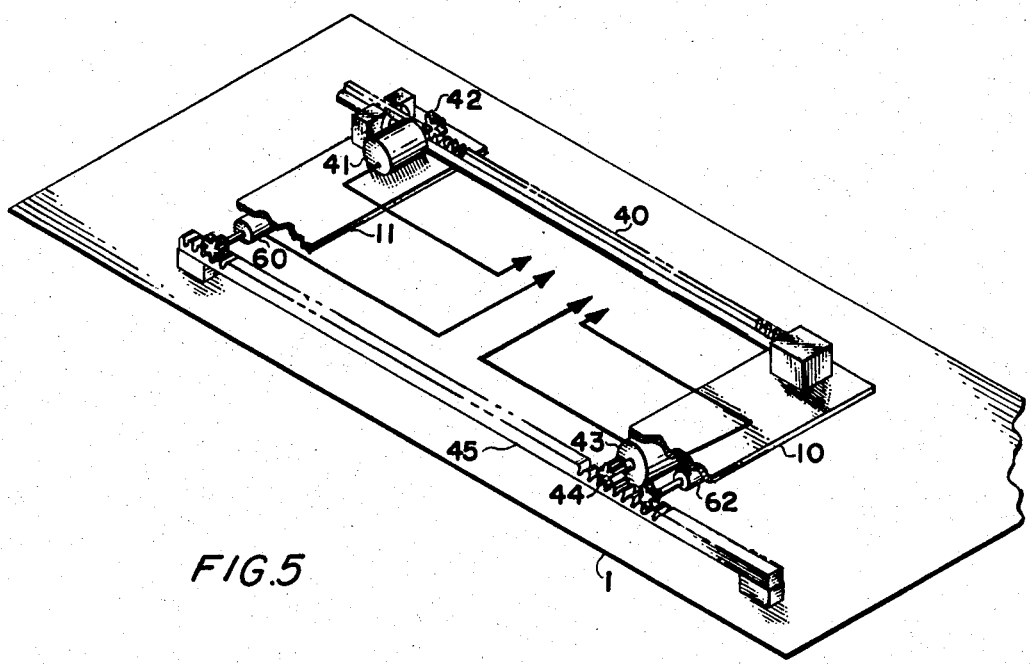
FIGURE 5 is a perspective view of the X axis drive for the carriages.

FIGURE 5 shows typical rack and pinion drive for the X-axis drive. Rack 40 is attached to the right carriage 10, sliding within a ball bushing located on the left carriage 11. This rack is rigidly mounted to the flattened surface of a hardened steel rod. The left motor-brake 41 moves only the left carriage 11 via pinion 42 on rack 40. When motor 41 is stopped it locks the pinion 42 without affecting the right carriage 10. However, the right motor 43 moves both carriages simultaneously via pinion 44 on rack 45 on table 1 when motor brake 41 is locked.

It may thus be seen from the above that two controls are provided: I. Move the left carriage only. II. Move both carriages simultaneously. All motor controls are preferably mounted on the control panel in conventional manner. For instance, the carriages may be controlled by joy stick type control switches 10a, 11a on the control panel 15. Conventional position measuring and transmitting means 60 and 62, geared to rack 45, are provided as described in connection with FIGURE 7.

The Y-axis drive is shown in FIGURE 6. The left hand carriage 11 contains a drive motor 46 geared to rack 47. In addition, it is geared through a clutch 48 to ten-turn potentiometer 49. The right hand carriage 10 contains a servo motor 51 geared to rack 52 and a ten-turn potentiometer 53. Potentiometers 50 and 53 are connected to a servo amplifier 54, which drives the servo motor 51 until both potentiometers 50 and 53 are in correspondence.

Thus, when it is desired to move the Y-axis (to adjust overlap) in the left frame only, the clutch 48 is de-energized; and, when it is desired to move both pickups simultaneously the clutch is energized. Now, the drive motor 46 is made to drive the potentiometer 50, which in turn controls the servo amplifier 54, driving motor 51, until potentiometer 53 is positioned to correspond with potentiometer 50. Therefore, both pickups would move simultaneously when the clutch is energized.

The servo amplifier 54 is a standard commercially available 60 c.p.s. amplifier. The potentiometers are chosen accurate to better than 0.1% linearity per each turn of their ten turns. No special design is required in any part of this conventional servo, and ±.0005" accuracy in 5" is expected in the servo followup.

It is noted here that the presence of the servo does not deteriorate the accuracy of the readout, since the accuracy of the position pickup system is independent of the gearing and servo drives.

As in the X-axis, two modes of controls are thus provided: I. Move the left carriage only. II. Move both carriages simultaneously. Alternatively conventional carriage control means are provided. Conventional position pickups 61 and 63 geared to racks 47 and 52 are provided as described in connection with FIGURE 7.

Referring to FIGURE 7 there is shown a schematic block diagram of suitable coordinate measuring means. The X and Y axis position pickups 60–63 may be potentiometers or commutator type encoders for converting shaft positions to decimal digital form. Two or more encoders may be used for unambiguous readings for the desired amount of travel. The signals from the position pickups are fed to storage and a translation means 64, 65, which may be controlled from a central control 66, to send the information through conventional distribution means 67 to various utilization apparatus as desired, for instance to a tape punch 68 or a visual digital indicator 69 or a recorder 70. At the same time the reading is triggered by the central control 66, other pertinent information may be incorporated in the record with a conventional manual keyboard control 71. All the above apparatus is conventional, for instance the shaft position pickups, storage and translation means are commercially available as well as the digital visual indication means. The utilization apparatus may be conventional depending upon the particular use to which the information is to be put.

Alternatively, the position indicating pickups may be of the optical type, for instance using optical diffraction gratings which generate pulse signals which may be counted to provide the necessary coordinate information. Such apparatus is commercially available and is described in British Pat. App. 760,321.

The film transport and viewing table assembly has been designed specifically for fast effortless data reduction from photographic information. The table permits simple easy loading, fast automatic film advance and illumination control on demand of operator sitting at the conveniently located control panel. The film drive may be conventional.

The table 1 is a partially enclosed frame which contains the following:

(1) Fluorescent lighting tubes 24, 25, FIGURE 3A, for illumination in general viewing of film.

(2) Special overhead and under lighting 23 for microscope illumination.

(3) Outboard open U type steady rest bearings 2 and 3, FIGURE 1, for easy spool loading and low friction film feeding.

(4) Torque motor 4, 4' at each spool for advancing of film in either direction. Motors are preferably electrically interlocked to top pressure plate lifting mechanism.

(5) Top pressure plate 6 to sandwich film for accurate viewing and measuring.

(6) Cam 55, 56 actuated lifting levers for raising top glass plate. The cam action is preferably mechanically and electrically interlocked to torque motors advancing film frames.

The objective rides on the pressure plates. These two glass pressure plates 6, 7 flatten out the film and aid in maintaining a fixed distance viewing plane. Furthermore, to prevent formation of Newton rings, these plates are separated slightly from each other by use of adjustable pre-set stops 60, 61 upon which the top pressure plates rest. This setting is independent of any lever action which is used to separate the plates during film transport.

High intensity illumination, FIGURE 3, is provided from both bottom or top of viewing plane so that either film or photographic prints may be conveniently illuminated and viewed at operator's command.

For easier viewing of points through the microscope, high intensity light sources 23 with heat absorbing filters are attached to the Y-axis carriages underneath the film and consequently travel in unison with the objective systems, illuminating the areas and points being measured.

Therefore, the present invention provides extreme ease of readout and comfort to the operator. Provisions are made for ease of film loading, minimum eye strain, and convenience of approach.

The operator can measure the X and Y coordinates of as many points as desirable, without removing his eye from the microscope. Central control with associated switches gives the operator the ability to control desirable motions without the need to see any dials or selector controls on the control panel.

When the two microscope objectives are driven toward the back of the table, the film is available for viewing directly by the operator. Even when the microscope objectives are above the film, only a very small portion of the film is obscured by the objectives, allowing the operator to view the film from sitting position near the control table.

Many modifications may be made by those who desire to practice the invention without departing from the scope thereof which is defined by the following claims.

We claim:

1. Remote film scanning and viewing means for interpreting, viewing and measuring co-ordinate points on large film of the type used in aerial surveys said film consisting of individual frame pictures on a film strip said pictures being taken at left and right position for stereo viewing comprising:

a table having X and Y axes, film transport means mounted on said table comprising a pair of spools one at either end thereof to move said film strip along said X axis of said table, illumination sources on said table to illuminate said film, said table being large enough to accommodate at least two of said frame pictures, a pair of optical pickup devices to receive stero optical images from said left and right frame pictures, means to movably mount a first of said optical pickup devices on said table for movement along X and Y axes of said table at a substantially large angle to each other, over a left frame picture, means to movably mount the second of said optical pickup devices on said table for movement along corresponding X and Y axes over a right frame picture, one of said axes being parallel to said axis of said table, position measuring means to measure the position of said optical pickup devices along said X and Y axes, a fiber optic cable connected to each of said optical pickup devices, a pair of stationary eye pieces mounted on said table, one of the fiber optic cables being connected at its other end to one of said stationary eye pieces, and the other said cables being connected at its other end to the other of said stationary eye pieces, and means to move said optical pickup means and position them with respect to said film on said table to view elemental areas of said film frame pictures.

2. Apparatus as in claim 1 wherein each of said optical pickup means comprises a first arm extending over said film, said first arm containing one image receiving means, and a second arm extending under said film, and a light source mounted in said second arm.

3. Remote film scanning and viewing means for interpreting, viewing and measuring co-ordinate points on large film of the type used in aerial surveys said film consisting of individual frame pictures on a film strip comprising;

a table having X and Y axes, film transport means mounted on said table comprising a pair of spools one at either end thereof to move said film strip along said X axis of said table, illumination sources on said table to illuminate said film, said table being large enough to accommodate at least one of said frame pictures, an optical pickup device to receive optical images from said film, means to movably mount said optical pickup device on said table for movement along X and Y axes of said table at a substantially large angle to each other, over said film frame picture, one of said axes being parallel to said axis of said table, position measuring means to measure the position of said optical pickup device along said X and Y axes, a fiber optic cable connected to said optical pickup device, a stationary eye piece mounted on said table, said fiber optic cable being connected at its other end to said stationary eye piece, and means to move said optical pickup means and position it with respect to said film on said table to view elemental areas of said film frame picture.

References Cited in the file of this patent

UNITED STATES PATENTS

| | | |
|---|---|---|
| 1,558,585 | Boykow | Oct. 27, 1925 |
| 1,751,584 | Hansell | Mar. 25, 1930 |
| 2,439,526 | Ott | Apr. 13, 1948 |
| 2,939,362 | Cole | June 7, 1960 |
| 2,964,643 | Hobrough | Dec. 13, 1960 |
| 2,975,785 | Sheldon | Mar. 21, 1961 |
| 2,982,175 | Eisler | May 2, 1961 |
| 2,987,960 | Sheldon | June 13, 1961 |
| 3,036,153 | Day | May 22, 1962 |
| 3,043,179 | Dunn | July 10, 1962 |
| 3,068,772 | MacNeille | Dec. 18, 1962 |